(12) United States Patent
Nie

(10) Patent No.: US 11,497,354 B2
(45) Date of Patent: Nov. 15, 2022

(54) AUTOMATIC DOUGH MIXER

(71) Applicant: JIANGMEN CITY XINHUI HENGLONG INNOVATIVE HOUSEWARES CO., LTD., Guangdong (CN)

(72) Inventor: Huayao Nie, Guangdong (CN)

(73) Assignee: JIANGMEN CITY XINHUI HENGLONG INNOVATIVE HOUSEWARES CO., LTD., Guangdong (CN)

( * ) Notice: Subject to any disclaimer, the term of this patent is extended or adjusted under 35 U.S.C. 154(b) by 190 days.

(21) Appl. No.: 16/591,375

(22) Filed: Oct. 2, 2019

(65) Prior Publication Data
US 2021/0038028 A1 Feb. 11, 2021

(30) Foreign Application Priority Data

Aug. 6, 2019 (CN) .......................... 201910720558.X

(51) Int. Cl.
 *B22C 5/00* (2006.01)
 *A47J 43/07* (2006.01)
 (Continued)

(52) U.S. Cl.
 CPC ............. *A47J 43/0705* (2013.01); *A21C 1/02* (2013.01); *A21C 1/14* (2013.01); *A47J 43/044* (2013.01); *A47J 2043/04463* (2013.01)

(58) Field of Classification Search
 CPC ..................... A47J 2043/04463; A21C 1/1445
 See application file for complete search history.

(56) References Cited

U.S. PATENT DOCUMENTS

| | | | |
|---|---|---|---|
| 913,766 A | 3/1909 | Rambeaud | |
| 2011/0203463 A1* | 8/2011 | Anderson | A21C 1/02 99/486 |

(Continued)

FOREIGN PATENT DOCUMENTS

| | | |
|---|---|---|
| CH | 92572 A | 1/1922 |
| CN | 206776625 U | 12/2017 |

(Continued)

OTHER PUBLICATIONS

Google machine translation for "FR-3014670-A1" (Year: 2015).*
The extended European search report issued in European Application No. 19200566.8, dated Apr. 24, 2020.

*Primary Examiner* — Anshu Bhatia
*Assistant Examiner* — Gregory Y Huan
(74) *Attorney, Agent, or Firm* — Hamre, Schumann, Mueller & Larson, P.C.

(57) ABSTRACT

Disclosed is an automatic dough mixer, comprising a base for placing and supporting, a body mounted on the base, a dough barrel mounted on the body as a container for dough mixing, a stirrer mounted on the body and arranged above the dough barrel for stirring flour and water in the dough barrel, a drive motor mounted on the body for driving the stirrer to rotate and stir, and an angle adjusting mechanism arranged between the base and the body for adjusting an inclination angle of the body relative to the base. The automatic dough mixer of the invention can effectively mix the flour in the dough barrel and avoid unmixed flour adhering to the dough barrel.

8 Claims, 9 Drawing Sheets

(51) Int. Cl.
*A21C 1/02* (2006.01)
*A21C 1/14* (2006.01)
*A47J 43/044* (2006.01)

(56) References Cited

U.S. PATENT DOCUMENTS

2018/0242784 A1* 8/2018 Hoyer .................. A47J 37/0611
2018/0255974 A1* 9/2018 Ahn .................... A47J 43/0716

FOREIGN PATENT DOCUMENTS

FR         3014670 A1 * 6/2015 ............ A47J 43/044
GB       1332458 A    10/1973

* cited by examiner

AUTOMATIC DOUGH MIXER

FIELD OF THE INVENTION

The present invention relates to a mixing device, and more particularly to an automatic dough mixer.

BACKGROUND OF THE INVENTION

In the existing art, a dough mixer is a household appliance, which is mainly used for mixing flour with water to save manpower and improve the mixing efficiency.

The conventional dough mixer generally includes a dough barrel, a stirrer, and a drive motor that drives the stirrer to knead dough.

Specifically, the stirrer is extended up and down, a top end of the stirrer is connected to the drive motor, and a bottom end of the stirrer is located in the dough barrel and immersed in a mixture of flour and water.

When the dough mixer operates, the drive motor drives the stirrer to rotate, and the stirrer stirs the flour and water in the dough barrel uniformly to form dough.

However, in actual use, the flour is adhered to the inner side on the top of the dough barrel, so that the flour cannot be effectively mixed into the dough.

SUMMARY OF THE INVENTION

The aim of the present invention is to solve the above-mentioned technical problem, and thus to provide an automatic dough mixer which can effectively mix flour in a dough barrel and avoid unmixed flour adhering to the dough barrel.

The present invention is realized through the following technical solutions:

A first aspect of the present invention provides an automatic dough mixer, comprising: a base for placing and supporting; a body mounted on the base; a dough barrel mounted on the body as a container for dough mixing; a stirrer mounted on the body, and arranged above the dough barrel for stirring flour and water in the dough barrel; a drive motor mounted on the body for driving the stirrer to rotate and stir; and an angle adjusting mechanism arranged between the base and the body for adjusting an inclination angle of the body relative to the base.

Compared with the conventional dough mixers of the prior art, the automatic dough mixer of the present invention has the advantages that, as the body on which the dough barrel and the stirrer are mounted can be inclined by means of the base and the angle adjusting mechanism, the dough can be in contact with the inner wall of the dough barrel in various positions to adhere the flour from the inner wall of the dough barrel, for better mixing to form a uniform dough, avoiding white points formed by unmixed flour adhered to the surface of the dough. The automatic dough mixer according to the invention can provide fully automatic dough mixing and improved mixing quality, without subsequent manual adjustment. In addition, as the body on which the dough barrel and the stirrer are mounted can be inclined at various angles, the dough is kneaded in various directions during being stirred, and thus the quality and mouthfeel of the dough are improved.

The automatic dough mixer according to the first aspect of the present invention, preferably, the angle adjusting mechanism is arranged on a side of the body away from the dough barrel.

Advantageously, he dough mixer has a gravity center located between the dough barrel and the angle adjusting mechanism, thereby improving the stability of the dough mixer, and preventing the entire dough mixer from tipping over when the body is inclined relative to the base.

The automatic dough mixer according to the first aspect of the present invention, preferably, the angle adjusting mechanism comprises a first shaft fixedly connected to the body and rotatably connected to the base, and a first motor fixedly connected to the base for driving the first shaft to rotate.

Advantageously, since the body is rotatably connected to the base by the first shaft, and the first shaft and the body are driven to rotate by the first motor, angle adjustment is achieved, the angle adjusting mechanism has a compact structure, and smaller volume. As the first motor is arranged on the base, the weight of the base is increased, the stability of the dough mixer is improved, and the dough mixer is prevented from tipping over.

The automatic dough mixer according to the first aspect of the present invention, preferably, the angle adjusting mechanism further comprises a gear reduction structure arranged between the first motor and the first shaft.

Advantageously, with the gear reduction structure, the rotation speed of the first shaft and the body is smaller than that of the first motor, so that the body can be slowly rotated and adjusted to a suitable angle, the inertia of rotation adjustment is reduced, the stability of angle adjustment is improved, the torque to the first motor is reduced, and the inclination angle of the body can be stably maintained.

The automatic dough mixer according to the first aspect of the present invention, further, the gear reduction structure comprises a large gear fitted on the first shaft and a pinion connected to an output end of the first motor, and the large gear is externally engaged with the pinion.

It is advantageous that, increasing the distance between the first motor and the first shaft by the gear reduction structure comprising a large gear and a pinion that are externally engaged with each other, can allow the center of the dough mixer to be close to the middle of the base to improve the stability of the dough mixer.

The automatic dough mixer according to the first aspect of the present invention, the angle adjusting mechanism further comprises an upper tile member and a lower tile member that are arranged coaxially, the upper tile member is connected to the body, the lower tile member is connected to the base, the upper tile member cooperates with the lower tile member to form a space for receiving the large gear, and the upper tile member abuts against the base and/or the lower tile member abuts against the body to restrict the rotation of the body.

Advantageously, the upper tile member and the lower tile member can cover the large gear to avoid accidents, and the upper tile member abuts against the base and/or the lower tile member abuts against the body to prevent further rotation of the body, thereby preventing the dough mixer from tipping over due to excessive rotation of the body.

The automatic dough mixer according to the first aspect of the present invention, further, the base comprises: a bottom shell for placing and supporting; a first cover for covering the bottom shell; and a second cover that cooperates with the first cover to cover the bottom shell, is higher than the first cover, and cooperates with the bottom shell to receive the first motor.

Advantageously, the base comprises a bottom shell, a first cover, and a second cover, this arranged is weight reducing and cost saving. As the second cover is constructed to cooperate with the bottom shell to receive the first motor, the first motor can be conveniently maintained by disassembling the second cover.

The automatic dough mixer according to the first aspect of the present invention, further, the body is provided with a first chamber, the first chamber is formed at the bottom of the body for receiving the first motor.

Advantageously, with the first chamber, a projecting portion of the base for receiving the first motor can be received by the body without increasing the height of the dough mixer, so that the dough mixer is compact in structure.

The automatic dough mixer according to the first aspect of the present invention, preferably, the dough barrel is rotatably connected to the body, and the body is provided with a second motor that drives the dough barrel to rotate.

Advantageously, as the second motor is arranged to drive the dough barrel to rotate, when the body is inclined, the wall of the dough barrel can be rotate to the bottom of the dough barrel to come into contact with the dough, so that the flour can be completely and uniformly mixed into the dough.

The automatic dough mixer according to the first aspect of the present invention, further, the second motor is arranged between the dough barrel and the angle adjusting mechanism.

Advantageously, the second motor is arranged between the dough barrel and the angle adjusting mechanism, so that the internal space of the dough barrel can be fully utilized without increasing the external size of the dough mixer, and the center of gravity of the dough mixer remains at the geometric center to improve the stability of the dough mixer.

BRIEF DESCRIPTION OF THE DRAWINGS

To describe the technical solutions in the embodiments of the present invention more clearly, the accompanying drawings required for describing the embodiments will be described briefly below.

Apparently, the described drawings are only part of, not all of the embodiments of the present invention, and other design schemes and Figs. may also be obtained by those skilled in the art according to the Figs. without any creative efforts.

DETAILED DESCRIPTION OF EMBODIMENTS

Figure 1:
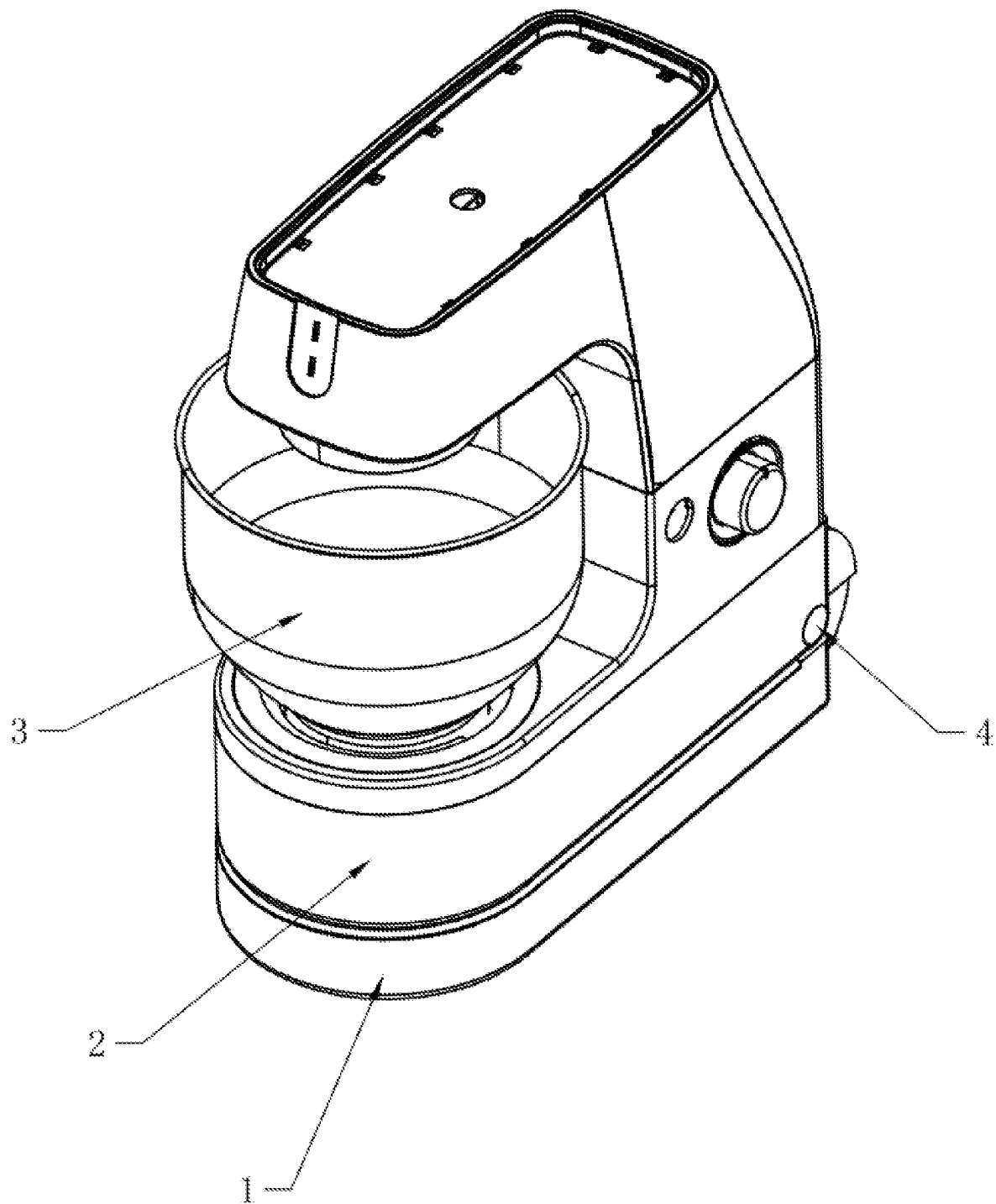
FIG. 1 is a schematic view of an automatic dough mixer according to the present invention.
Figure 2:
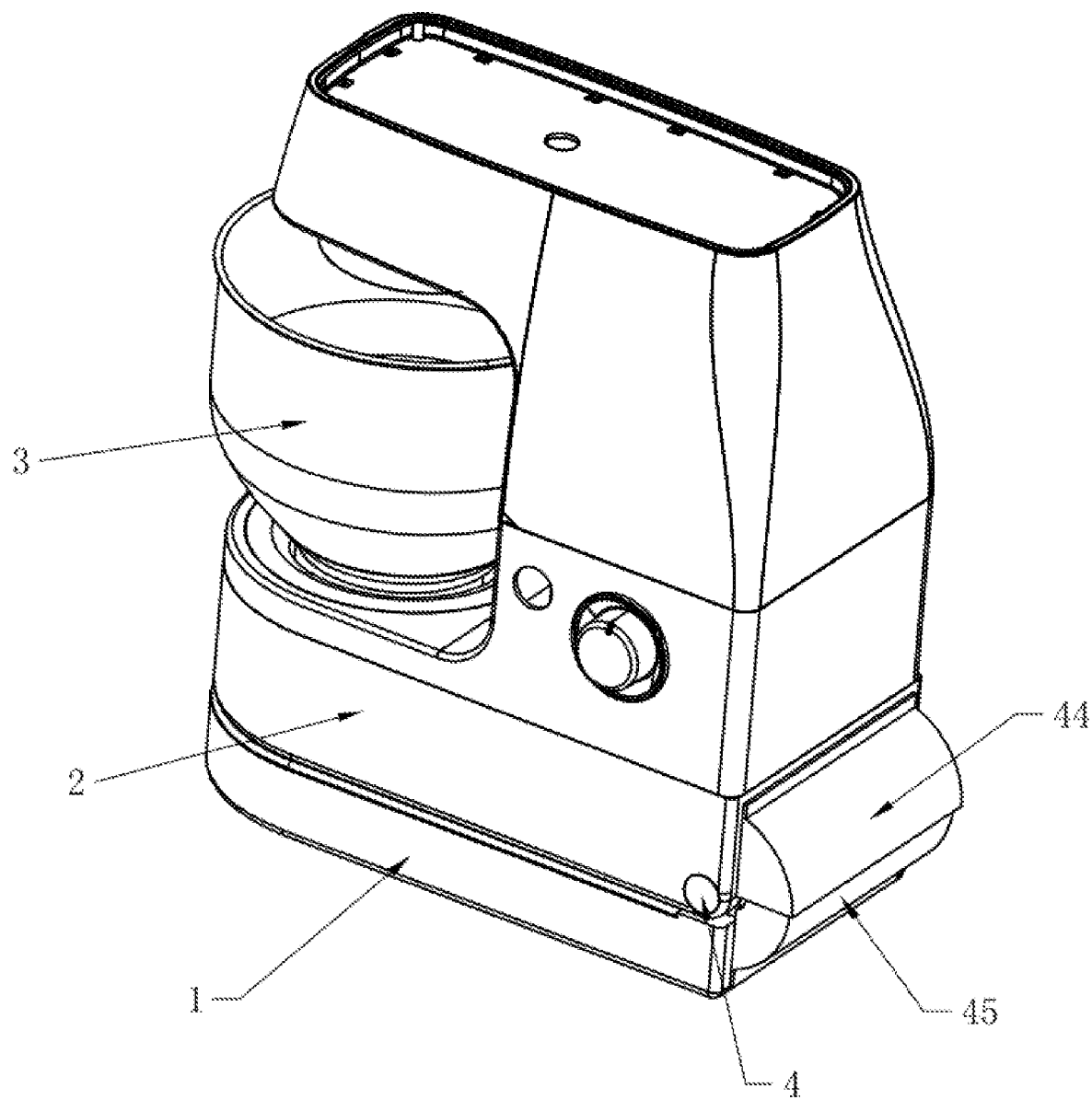
FIG. 2 is a schematic view of the dough mixer of FIG. 1 in another direction.

Specific embodiments of the present invention will be described in detail in this section, these preferred embodiments of the present invention are illustrated in the accompanying drawings, and the accompanying drawings are used to provide figures as a supplement to the text of the description, so that a person can intuitively and vividly understand each technical feature and overall technical solutions of the present invention. However the accompanying drawings cannot be understood as limitations to the scope of the present invention.

In the description of the present invention, it should be understood that the orientation descriptions, such as orientations or positional relationships indicated by upper, lower, front, rear, left and right are based on the orientations or positional relationships shown in the Figs., are only for description convenience of the present invention and simplification of the description, but do not indicate or imply that the pointed devices or elements must have specific orientations or be constructed and operated in specific orientations, and therefore, should not be understood as limitations to the present invention.

In the description of the present invention, "a plurality of" means one or more, and "multiple" means two or more; "greater than", "smaller than", "more than", etc. are understood as not including the current number; and "above", "below", "within", etc. are understood as including the current number. "First" and "second" described are only for describing the technical features, and cannot be understood as indicating or implying the relative importance or implicitly indicating the quantity of the indicated technical features or implicitly indicating the sequence of the indicated technical features.

In the description of the present invention, unless otherwise specified, the terms such as "provided", "mounted" and "connected" should be understood in a broad sense, and the specific meanings of the terms in the present invention can be reasonably determined by those skilled in the art in light of the specific contents of the technical solutions.

As shown in FIGS. 1-3 and 9, an automatic dough mixer comprises a base 1, a body 2, a dough barrel 3, a stirrer, and a drive motor.

The base 1 is formed to contain and support the dough mixer. The body 2 is mounted on the base 1 for mounting functional components. The dough barrel 3, the stirrer 7, and the drive motor are used as functional components and thereby mounted on the body 2.

The dough barrel 3 is used as a container for dough mixing. The stirrer 7 is arranged above the dough barrel 3 for stirring the flour and water in the dough barrel 3. The drive motor is arranged to drive the stirrer 7 to rotate and stir.

The stirrer and the drive motor are of conventional configurations of the dough mixer, and thus are not shown in detail.

As shown in FIGS. 1-3 and 8, an angle adjusting mechanism 4 is arranged between the base 1 and the body 2, and the angle adjusting mechanism 4 is operative to adjust the inclination angle of the body 2 relative to the base 1.

In brief, the functional parts of the entire dough mixer are placed on the base 1, and the dough mixer can be inclined to simulate the situation that the dough barrel 3 is inclined for manually dough mixing.

This brings the advantages that, the dough can come into contact with the inner wall of the dough barrel 3 in different positions, to adhere more flour from the inner wall of the dough barrel 3, so that the flour can be fully mixed to form a uniform dough, avoiding white points of flour on the surface of the dough, providing better mixing quality, saving subsequent manual intervention, and thus achieving fully automatic dough mixing.

In addition, as the body 2 on which the dough barrel 3 and the stirrer are mounted can be inclined at different angles, the dough is kneaded in all directions during stirring, resulting in improved quality and mouthfeel of the dough.

In order to arrange the angle adjusting mechanism 4 reasonably, in some embodiments, the angle adjusting mechanism 4 may be arranged on a side of the body 2 away from the dough barrel 3.

With such an improved arrangement, as the angle adjusting mechanism 4 is arranged on the side of the body 2 away from the dough barrel 3, the center of gravity of the dough mixer is located between the dough barrel 3 and the angle adjusting mechanism 4, resulting in better stability for dough mixer, and preventing the entire dough mixer from tipping over when the body 2 is inclined relative to the base 1.

In some embodiments, the angle adjusting mechanism is provided with a plurality of indexing holes and indexing pins for angle adjustment.

Figure 3:
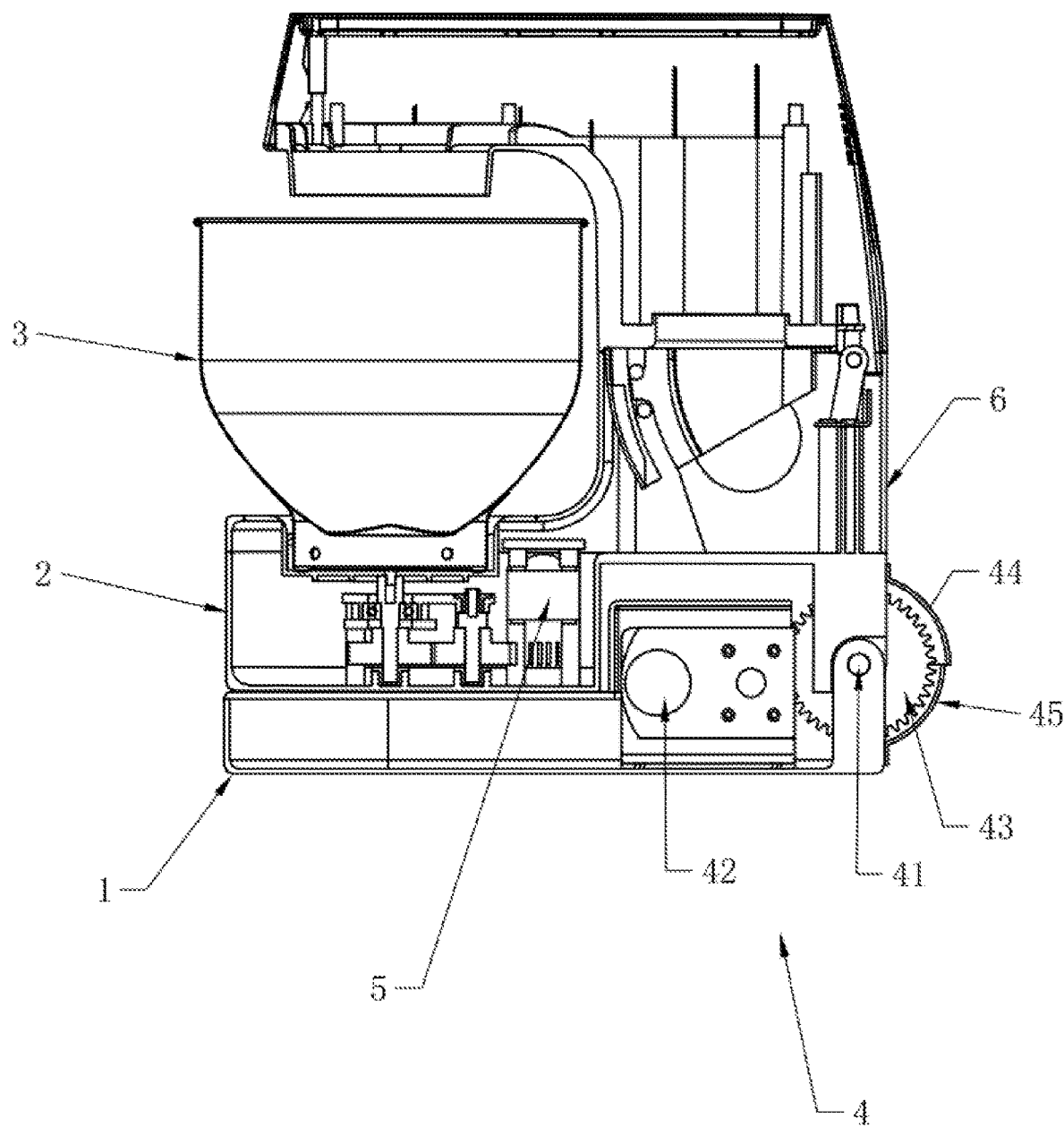
FIG. 3 is a cross-sectional schematic view of the dough mixer of FIG. 1.
Figure 4:
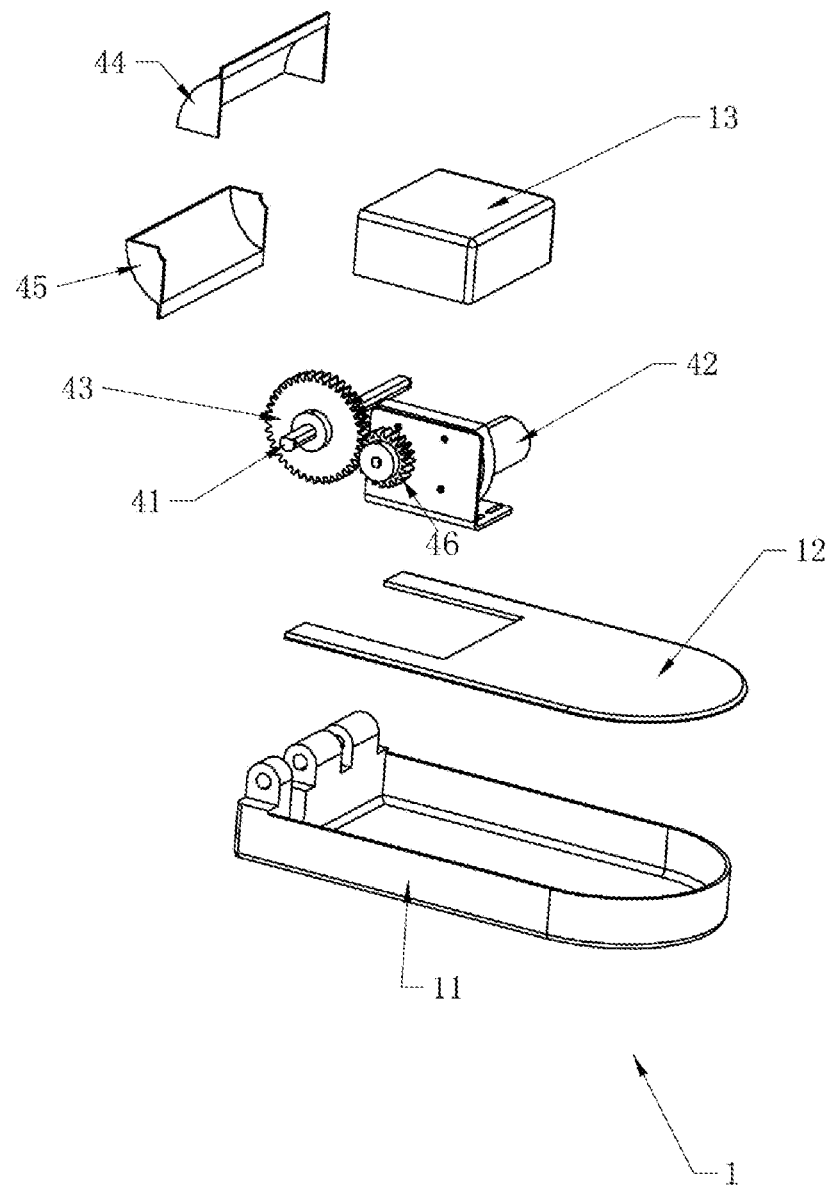
FIG. 4 is a partial exploded view of the dough mixer of FIG. 1.

As shown in FIGS. 3 and 4, in some embodiments, the angle adjusting mechanism 4 may comprises a first shaft 41 and a first motor 42.

The first shaft 41 is fixedly connected to the body 2, the first motor 42 is rotatably connected to the base 1, and accordingly, the body 2 is rotatably connected to the base 1. The first motor 42 is fixedly arranged on the base 1 for driving the first shaft 41 to rotate, then to drive the body 2 to rotate.

Figure 8:
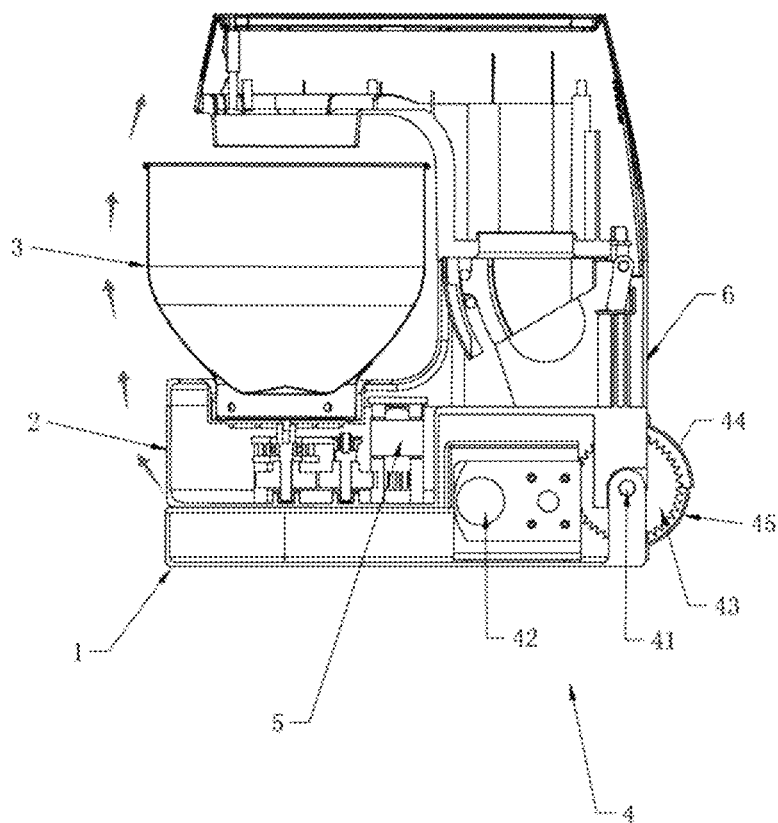
FIG. 8 is a schematic view for showing the actual angle adjusting mechanism in operation by means of arrows.
Figure 9:
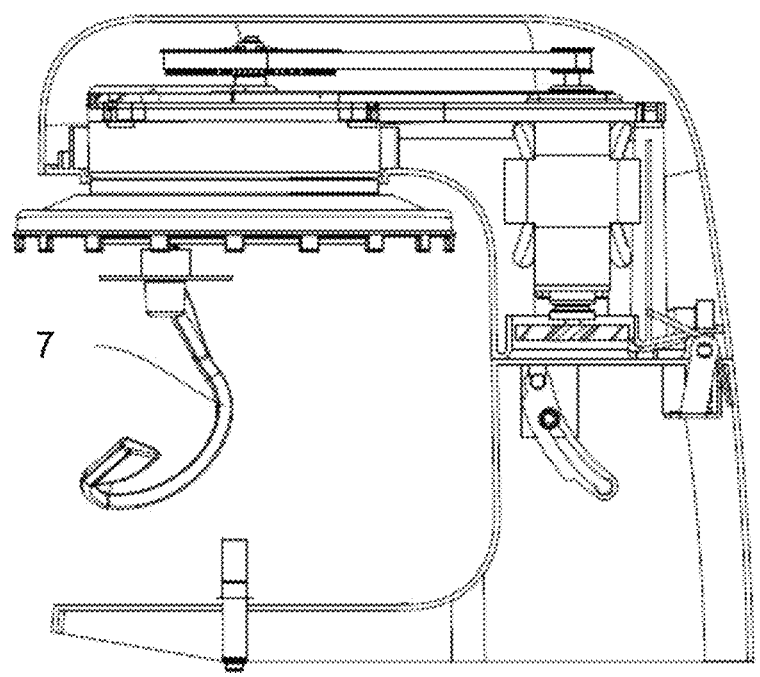
FIG. 9 is a schematic view of an example of a stirrer.

As seen in FIG. 8, this arrangement may provide the advantages that, the rotatable connection between the body 2 and the base 1 is achieved by the first shaft 41. and the first motor 42 is arranged to drive the first shaft 41 and the body 2 to rotate, for providing the promised angle adjustment. The resulted structure is compact, and only occupies a small space. On the other hand, the first motor 42 is arranged on the base 1, increasing the weight of the base 1, thereby improving the stability of the dough mixer, and preventing the dough mixer from tipping over.

Alternatively, the first motor 42 may also be fixed to the body 2, and the first shaft 41 is fixed to the base 1 to achieve the same effects.

In some embodiments, the angle adjusting mechanism 4 may further comprises a gear reduction structure arranged between the first motor 42 and the first shaft 41.

It can be known by calculation that, as the rotation speed of the first shaft 41 and the body 2 is smaller than that of the first motor 42 while the gear reduction structure is provided, on one hand, the body 2 is slowly rotated and adjusted to a suitable angle, on the other hand, the rotation adjustment has a reduced inertia, and consequently improved stability, on the other hand again, the first motor 42 suffers reduced torque, and thus the body 2 can have a stably maintained inclination angle.

As shown in FIGS. 3 and 4, in some embodiments in which the gear reduction structure is provided, the gear reduction structure may comprise a large gear 43 sleeved on the first shaft 41 and a pinion 46 connected to an output end of the first motor 42, and the large gear 43 is externally engaged with the pinion 46.

It is very advantageous that, increasing the distance between the first motor 42 and the first shaft 41 by the gear reduction structure comprising a large gear 43 and a pinion 46 that are externally engaged with each other, can allow the center of the dough mixer to be close to the middle of the base 1 and thus improve the stability of the dough mixer.

As shown in FIGS. 3 and 4, in some embodiments, the angle adjusting mechanism 4 may further comprises an upper tile member 44 and a lower tile member 45 that are arranged coaxially and are curved plates.

The upper tile member 44 is connected to the body 2, the lower tile member 45 is connected to the base 1, and the upper tile member 44 and the lower tile member 45 in cooperation with each other forms a space for receiving the large gear 43.

In order to reasonably control the range of rotation of the body 2, the upper tile member 44 may abut against the base 1, or the lower tile member 45 may abut against the body 2 to restrict the rotation of the body 2.

Significantly, the upper tile member 44 and the lower tile member 45 can cover the large gear 43 to avoid accidents.

In addition, the upper tile member 44 or the lower tile member 45 can prevent further rotation of the body 2, thereby preventing the dough mixer from tipping over due to excessive rotation of the body 2.

As shown in FIG. 3, in some embodiments, the base 1 may comprise a bottom shell 11, a first cover 12, and a second cover 13.

The bottom shell 11 is constructed to form an actual support and placement site for the dough mixer. The first cover 12 and the second cover 13 are arranged to cover the bottom shell 11 for aesthetics.

In some embodiments, the second cover 13 is higher than the first cover 12, and the second cover 13 is arrange to cooperate with the bottom shell 11 for receiving the first motor 42.

Significantly, the base 1 comprises a bottom shell 11, a first cover 12, and a second cover 13, this arrangement is weight reducing and cost saving.

Furthermore, since the second cover 13 and the bottom shell 11 are in cooperation to receive the first motor 42, the first motor 42 can be easily maintained by disassembling the second cover 13.

As shown in FIG. 3, in some embodiments, the body 2 may be provided with a first chamber, the first chamber is formed at the bottom of the body 2, to allow the pass through of the first motor 42, that is, when the body 2 rotates, the first motor 42 can move in and move out the first chamber without interference.

By providing the first chamber in this embodiment, a projecting portion of the base 1 for receiving the first motor 42 can be received by the body 2 without increasing the height of the dough mixer, the dough mixer is thus compact in structure.

Figure 5:
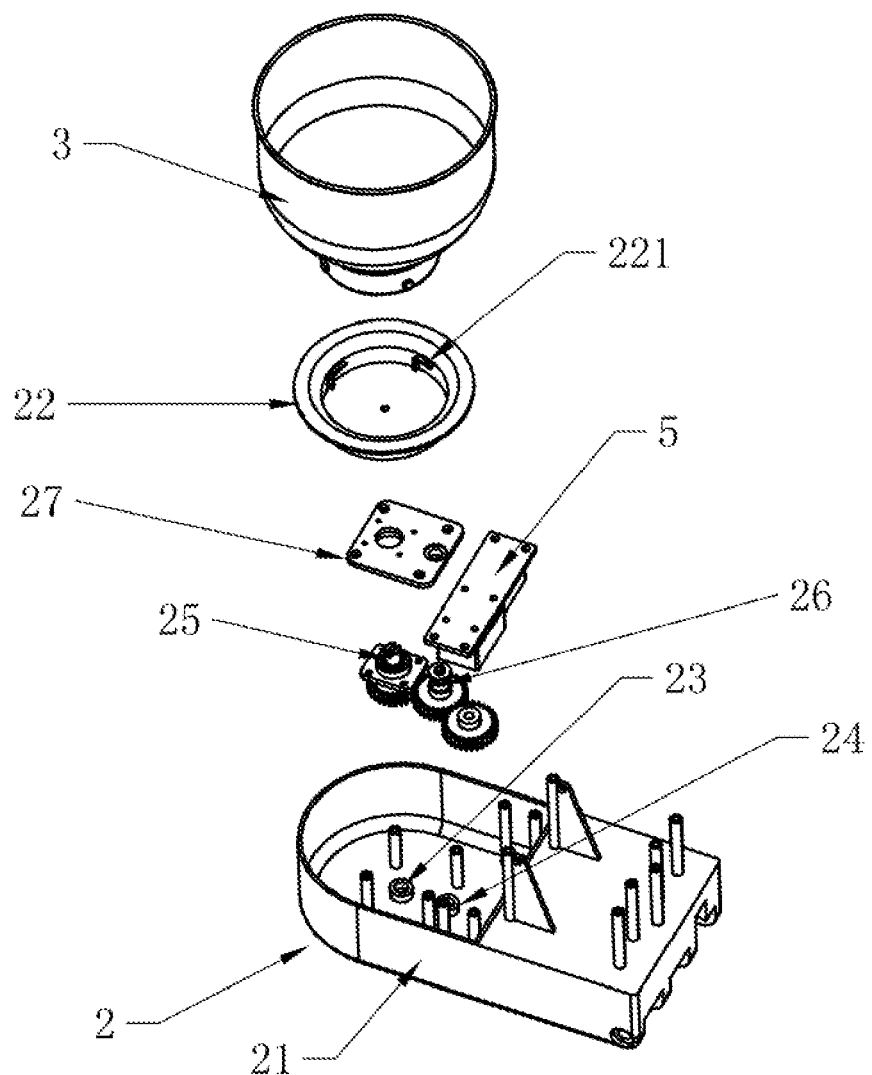
FIG. 5 is another partial exploded view of the dough mixer of FIG. 1.
Figure 6:
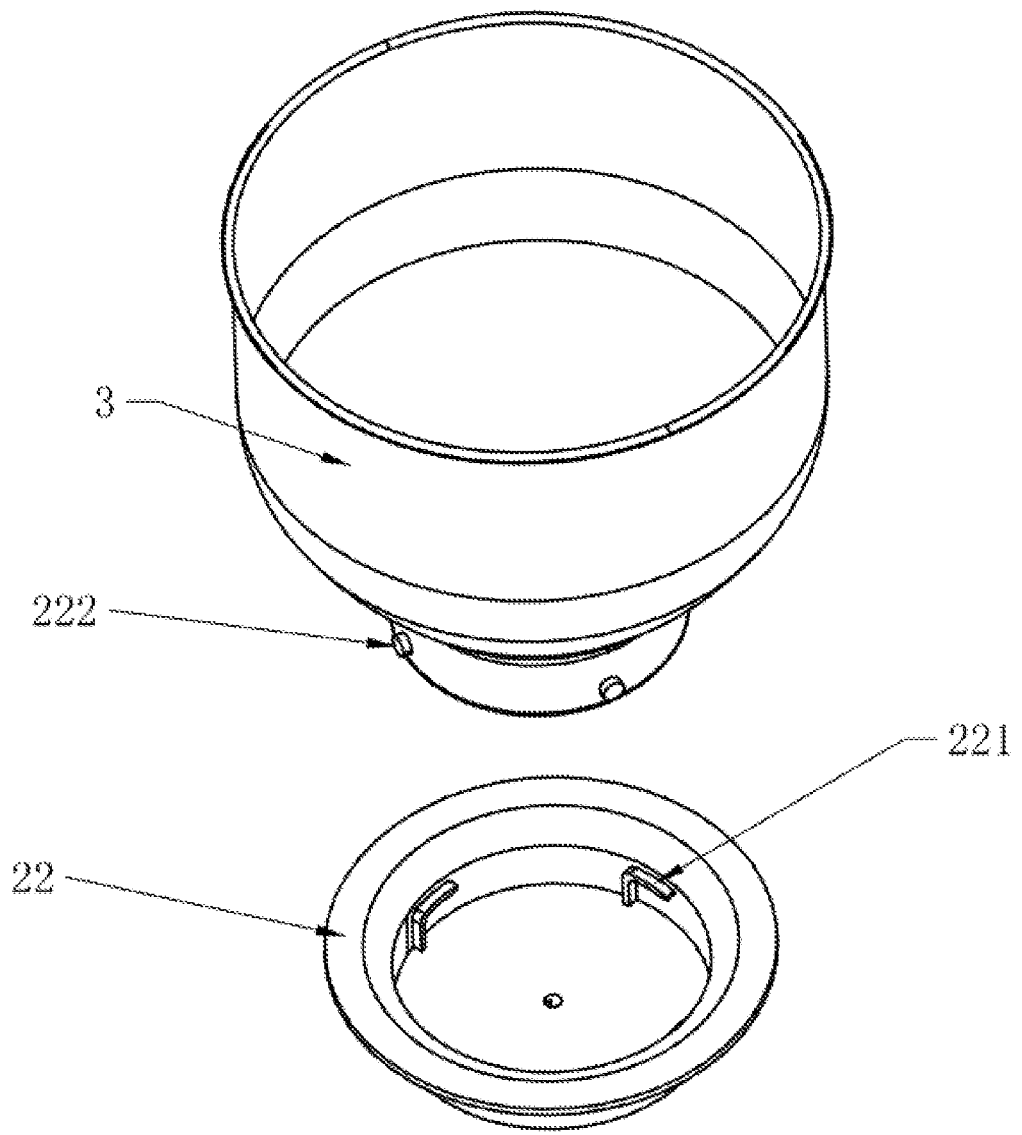
FIG. 6 is a partial enlarged view of FIG. 5.
Figure 7:
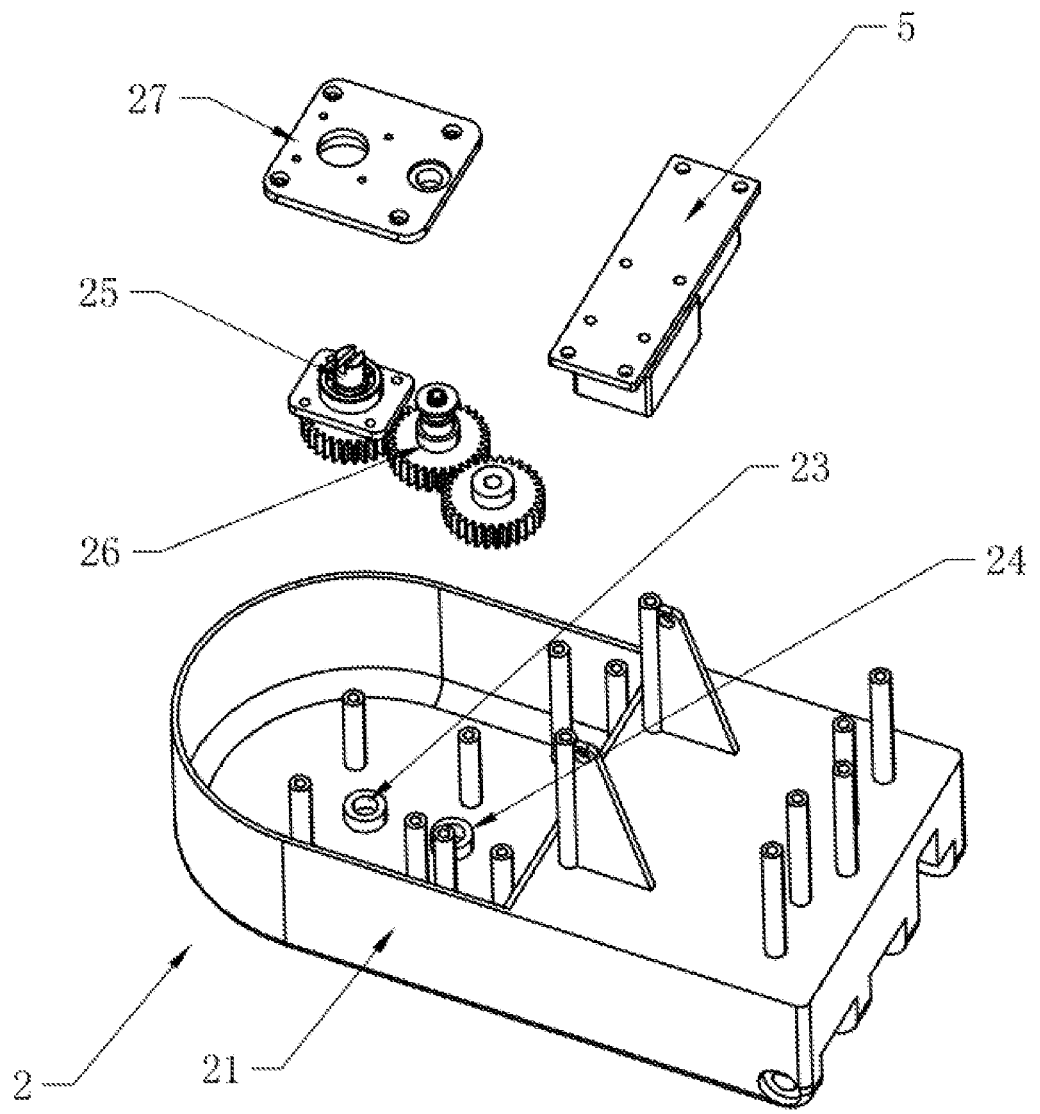
FIG. 7 is another partial enlarged view of FIG. 5.

In some embodiments, as shown in FIGS. 5-7, the dough barrel 3 may be rotatably connected to the body 2, and the body 2 is provided with a second motor 5 that drives the dough barrel 3 to rotate.

In this embodiment, the rotatable dough barrel 3 and the second motor 5 that drives the dough barrel 3 to rotate are provided to improve the relative speed of the stirrer and the flour, for improved mixing efficiency, and shortened mixing time. In addition, the relative speed of the stirrer and the flour can be adjusted by adjusting the output of the second motor 5 to provide multiple adjustment modes, facilitating the mixing of the flours of different masses, and improving the mixing effect. Moreover, the use of the second motor 5 instead of the drive motor to drive the dough barrel 3 to rotate can bring about an optimized transmission structure, without influence on the disassembly and assembly of the stirrer and the use and cleaning of the dough barrel 3.

Furthermore, when the body 2 is inclined, the wall of the dough barrel 3 can rotate to a position close to the bottom of the dough barrel 3 and come into contact with the dough therein, this arrangement allow the flour to be completely and uniformly mixed into the dough.

In some embodiments in which a second motor 5 is provided, and arranged between the dough barrel 3 and the angle adjusting mechanism 4.

Since the second motor 5 is arranged between the dough barrel 3 and the angle adjusting mechanism 4, the internal space of the dough barrel 3 can be fully utilized and thus the external size of the dough mixer will not be increased, and the center of gravity of the dough mixer can remain at the geometric center for improved stability of the dough mixer.

To be precise, as shown in FIG. 3, the box 21 is provided with a column 6 for mounting the stirrer and the drive motor, and the second motor 5 is arranged between the column 6 and the swivel 22.

Similarly, since the second motor 5 is arranged between the column 6 and the swivel 22, the space can be fully utilized, and thus the dough mixer is compact in structure and occupies a small space.

More specifically, as shown in FIGS. 5-7, the body 2 comprises a box 21 provided with a swivel 22 for mounting the dough barrel 3, the second motor 5 is arranged in the box 21, and a gear transmission structure is arranged in the box 21 and between the swivel 22 and the second motor 5.

Obviously, power is reliably transmitted by gear transmission, and arranging the gear transmission structure and the second motor 5 within the box 21 can avoid exposure and thus be well protected.

In some embodiments, the second motor 5 may have an axis direction perpendicular to the connection direction of the swivel 22 and the column 6.

Arranging the axis direction of the second motor 5 along the width direction of the dough mixer does not increase the length of the dough mixer, and rarely affects the appearance of the dough mixer.

In some embodiments, the gear transmission structure may comprises a first transmission shaft 25 arranged coaxially with the swivel 22, first transmission shaft 25 has a top end inserted into and connected to the swivel 22, and the box 21 is provided with a first positioning hole 23 for receiving a bottom end of the first transmission shaft 25.

The disassembly and assembly of the first transmission shaft 25 is effectively facilitated, and two ends of the first transmission shaft 25 are limited to prevent the first transmission shaft 25 from swinging due to the transmission.

In some embodiments in which the first transmission shaft 25 is arranged, the gear transmission structure may further comprise a second transmission shaft 26 for a transmission connection between the first transmission shaft 25 and the second motor 5, and a support 27 for mounting the first transmission shaft 25 and the second transmission shaft 26. The support 27 is connected to the tops of the first transmission shaft 25 and the second transmission shaft 26, and the box 21 is provided with a second positioning hole 24 for receiving a bottom end of the second transmission shaft 26.

After the top or bottom of the box 21 is removed, the entire gear transmission structure can be directly removed, this arrangement allows convenient disassembly and assembly and easy maintenance for the entire gear transmission structure.

In some embodiments, the swivel 22 may be provided with a mounting cavity for receiving a bottom end of the dough barrel 3, the dough barrel 3 is provided with a plurality of stop pins 222 arranged on the outer side thereof, and the mounting cavity is provided with stop buckles 221 arranged on the inner side thereof for clamping the stop pins 222.

The provision of the stop buckles 221 and the stop pins 222 provides convenience for the disassembly, assembly and cleaning of the dough barrel 3.

In some embodiments in which stop buckles 221 are provided, the stop buckles 221 comprises lateral buckle slots extending circumferentially along the swivel 22 and longitudinal buckle slots extending axially along the swivel 22.

The lateral buckle slots prevent the dough barrel 3 from flying off during rotation, and the power of the second motor 5 can be transmitted to the dough barrel 3 by the longitudinal buckle slots so as to drive the dough barrel 3 to rotate.

The above embodiments are not limited to the technical solutions of the embodiments, and may be combined with each other to form new embodiments. The above embodiments are only for describing the technical solutions of the present invention, rather than limiting the present invention. Any modifications or equivalent substitutions made without departing from the spirit and scope of the present invention shall fall into the scope of the technical solutions of the present invention.

The invention claimed is:

1. An automatic dough mixer, comprising:
    a base, for placing and supporting;
    a body, mounted on the base;
    a dough barrel, mounted on the body as a container for dough mixing;
    a stirrer, mounted on the body and above the dough barrel, for stirring flour and water in the dough barrel;
    a drive motor, mounted on the body for driving the stirrer to rotate and stir; and
    an angle adjusting mechanism, arranged between the base and the body and on a side of the body away from the dough barrel for adjusting an inclination angle of the body relative to the base during the dough mixing such that dough is in contact with an inner wall of the dough barrel in various positions to adhere the flour from the inner wall of the dough barrel, the automatic dough mixer has a center of gravity located between the dough barrel and the angle adjusting mechanism thereby preventing the automatic dough mixer from tipping over when the body is inclined relative to the base,
    wherein the angle adjusting mechanism comprises:
    a first shaft fixedly connected to the body, and rotatably connected to the base; and
    a first motor fixedly connected to the base for driving the first shaft to rotate,
    a gear reduction structure arranged between the first motor and the first shaft, the gear reduction structure comprises a large gear fitted on the first shaft and a pinion connected to an output end of the first motor, and the large gear is externally engaged with the pinion;
    an upper tile member and a lower tile member that are arranged coaxially, the upper tile member is connected to the body, the lower tile member is connected to the base, the upper tile member and the lower tile member are in cooperation to form a space for receiving the large gear, and the upper tile member abuts against the base and/or the lower tile member abuts against the body to restrict the rotation of the body.

2. The automatic dough mixer according to claim 1, wherein the base comprises:
    a bottom shell for placing and supporting;
    a first cover for covering the bottom shell; and
    a second cover in cooperation with the first cover to cover the bottom shell, the second cover being higher than the first cover for receiving the first motor in cooperation with the bottom shell.

3. The automatic dough mixer according to claim 1, wherein the body is provided with a first chamber formed at the bottom of the body and receiving the first motor.

4. The automatic dough mixer according to claim 1, wherein the dough barrel is rotatably connected to the body, and the body is provided with a second motor for driving the dough barrel to rotate.

5. The automatic dough mixer according to claim 4, wherein the second motor is arranged between the dough barrel and the angle adjusting mechanism.

6. The automatic dough mixer according to claim 2, wherein the base shell of the base has a bottom planar surface that is parallel to the first cover.

7. The automatic dough mixer according to claim 1, wherein the upper tile member and the lower tile member each comprise a protrusion, in which the protrusion is configured to abut against the base and/or against the body to restrict the rotation of the body.

8. An automatic dough mixer, consisting essentially of:
- a base, for placing and supporting;
- a body, mounted on the base;
- a dough barrel, mounted on the body as a container for dough mixing;
- a stirrer, mounted on the body and above the dough barrel, for stirring flour and water in the dough barrel;
- a drive motor, mounted on the body for driving the stirrer to rotate and stir; and
- an angle adjusting mechanism, arranged between the base and the body and on a side of the body away from the dough barrel for adjusting an inclination angle of the body relative to the base during the dough mixing such that dough is in contact with an inner wall of the dough barrel in various positions to adhere the flour from the inner wall of the dough barrel, the automatic dough mixer has a center of gravity located between the dough barrel and the angle adjusting mechanism thereby preventing the automatic dough mixer from tipping over when the body is inclined relative to the base, wherein the angle adjusting mechanism comprises:
- a first shaft fixedly connected to the body, and rotatably connected to the base; and
- a first motor fixedly connected to the base for driving the first shaft to rotate;
- a gear reduction structure arranged between the first motor and the first shaft, the gear reduction structure comprises a large gear fitted on the first shaft and a pinion connected to an output end of the first motor, and the large gear is externally engaged with the pinion;
- an upper tile member and a lower tile member that are arranged coaxially, the upper tile member is connected to the body, the lower tile member is connected to the base, the upper tile member and the lower tile member are in cooperation to form a space for receiving the large gear, and the upper tile member abuts against the base and/or the lower tile member abuts against the body to restrict the rotation of the body.

* * * * *